J. B. WILLYERD.
COMBINED PORTABLE PHOTOGRAPHIC APPARATUS AND DARK ROOM.
APPLICATION FILED DEC. 11, 1908.
929,809.
Patented Aug. 3, 1909.
2 SHEETS—SHEET 1.
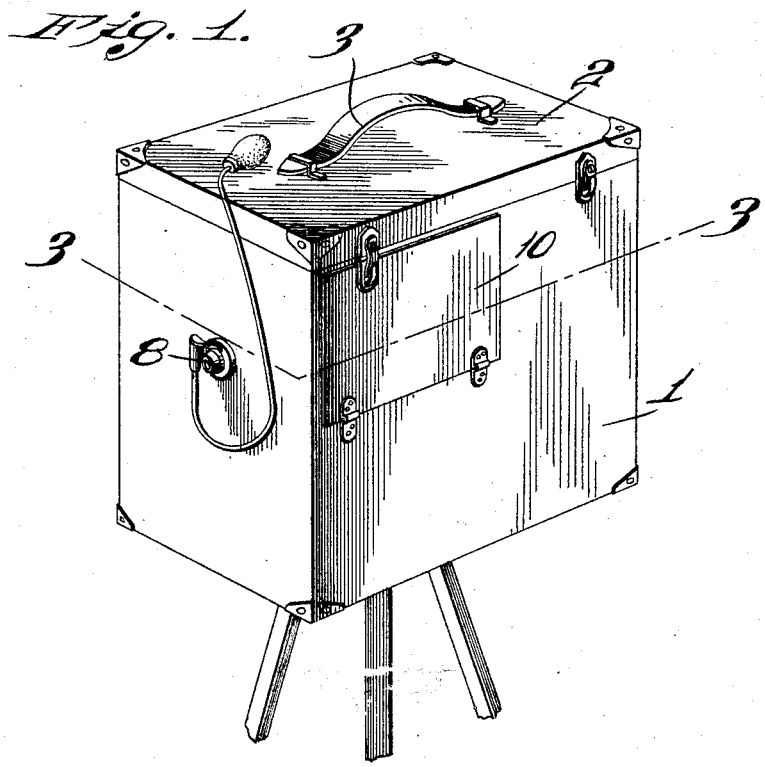
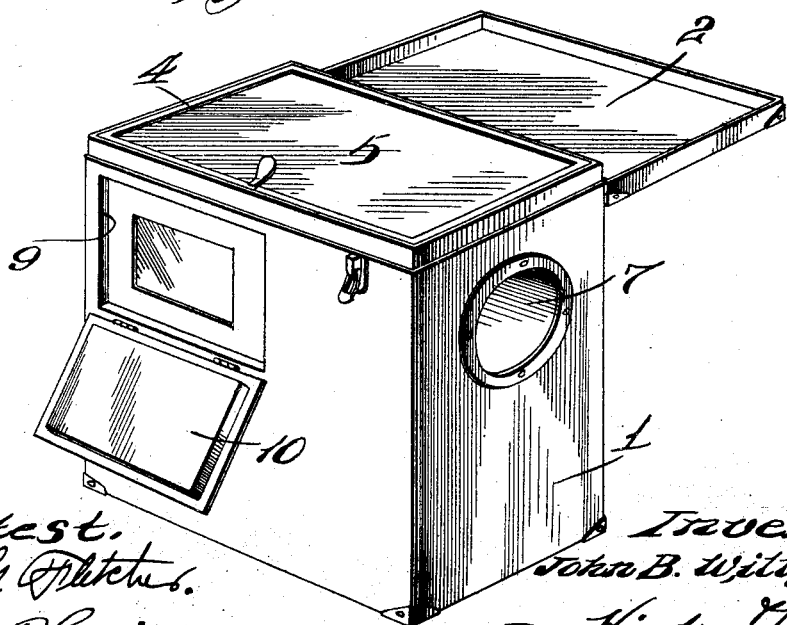

J. B. WILLYERD.
COMBINED PORTABLE PHOTOGRAPHIC APPARATUS AND DARK ROOM.
APPLICATION FILED DEC. 11, 1908.
929,809.
Patented Aug. 3, 1909.
2 SHEETS—SHEET 2.
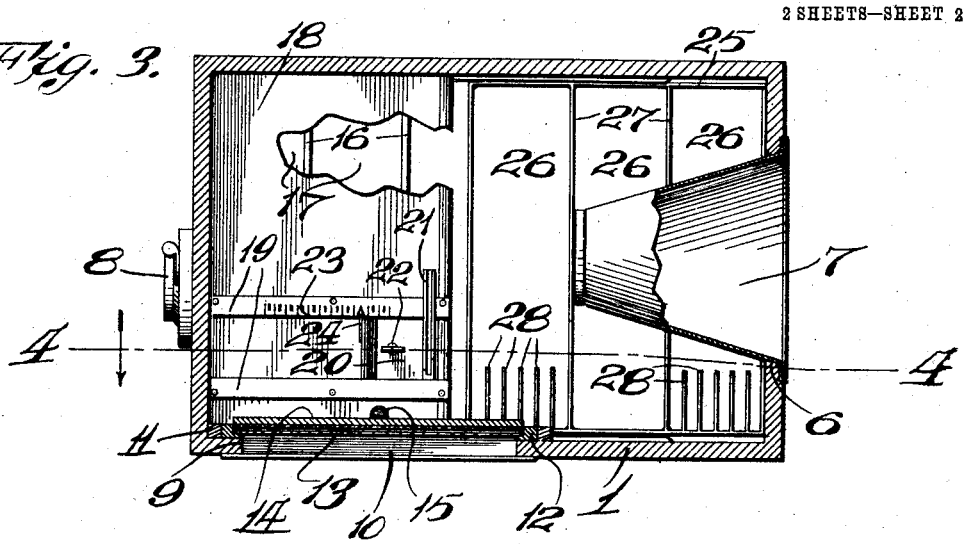
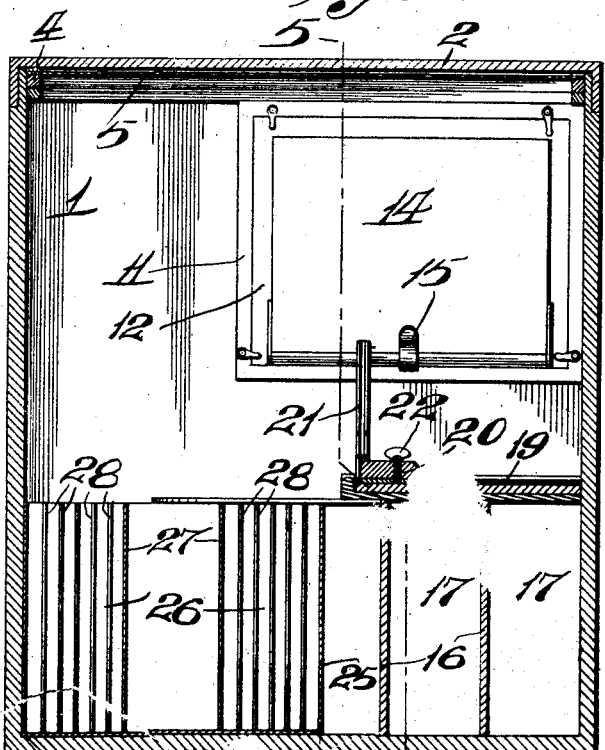
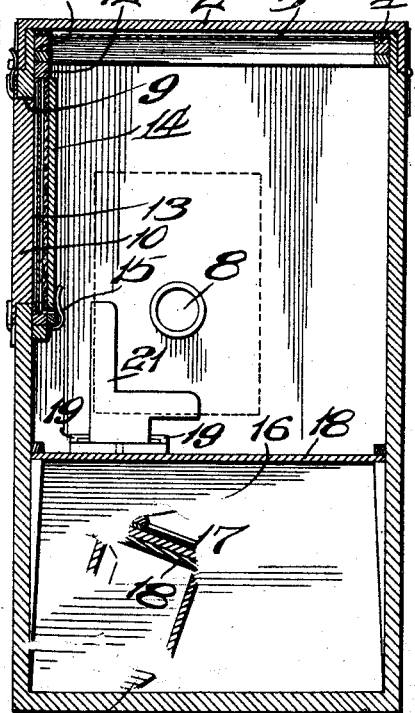
attest.
H. G. Fletcher.
M. O. Smith.
Inventor.
John B. Willyerd.
By Higdon Longan
attys.

UNITED STATES PATENT OFFICE.

JOHN B. WILLYERD, OF ST. LOUIS, MISSOURI.

COMBINED PORTABLE PHOTOGRAPHIC APPARATUS AND DARK ROOM.

No. 929,809.     Specification of Letters Patent.     Patented Aug. 3, 1909.

Application filed December 11, 1908. Serial No. 467,110.

*To all whom it may concern:*

Be it known that I, JOHN B. WILLYERD, a citizen of the United States, and resident of St. Louis, Missouri, have invented certain new and useful Improvements in a Combined Portable Photographic Apparatus and Dark Room, of which the following is a specification containing a full, clear, and exact description, reference being had to the accompanying drawings, forming a part hereof.

My invention relates to a combined portable photographic apparatus and dark room, the object of my invention being to construct a simple, convenient and compact apparatus particularly adapted for making photographic negatives, developing and fixing the same, and then printing pictures from said negatives upon sensitized sheets or cards, which latter are subjected to the developing and fixing baths and are then ready for delivery.

A further object of my invention is to construct a simple photographic apparatus and to provide the same with an opaque outer cover and with a transparent inner cover of colored celluloid or glass, which will readily permit an inspection of the interior of the apparatus while the negatives are being developed and the pictures being printed therefrom, and which inner cover is of such color as to cut off the actinic rays of light from the interior apparatus.

To the above purposes my invention consists in certain novel features of construction and arrangement of parts hereinafter more fully set forth, pointed out in the claims and illustrated in the accompanying drawings, in which:

Figure 1 is a perspective view of an apparatus of my improved construction and looking at the front end thereof; Fig. 2 is a perspective view of the apparatus showing the outer cover swung open, and with the cover of the printing aperture swung open; Fig. 3 is a horizontal section taken on the line 3—3 of Fig. 1; Fig. 4 is a vertical section taken on the line 4—4 of Fig. 3, and looking in the direction indicated by the arrow of said line 4—4; Fig. 5 is a vertical section taken on the line 5—5 of Fig. 4.

Referring by numerals to the accompanying drawings: 1 designates the body of my improved apparatus, which is in the form of a rectangular box which may be mounted on a tripod or suitable base, and adapted to normally close the top of the box is a hinged outer cover 2, provided with a handle 3, by means of which the apparatus is carried, and removably arranged in the top of the box and occupying a position immediately beneath the cover 2 is a rectangular frame 4, to which is fitted a section 5 of transparent red celluloid or glass, which construction permits a view of the entire interior of the body 1, while the operator is developing a negative or printing pictures therefrom, and by reason of the celluloid or glass being red in color, the actinic rays of light are prevented from entering the apparatus and affecting the undeveloped negatives or unfixed picture.

Formed in the rear end wall of the body 1 is a circular opening 6 and fixed to the end wall around this opening is the edge of a flexible sleeve 7, preferably of dark cloth or rubber, the opposite end of which is adapted to snugly fit around the wrist of the operator, and said sleeve being of such length as that it can be withdrawn from the body 1 and collapsed so as to prevent the light from entering the interior of the box.

Arranged in the central portion of the front end wall of the box is an ordinary photographic lens and shutter 8, which is operated in any suitable manner.

Formed in the upper portion of the left-hand side wall of the box is a rectangular opening 9, which is normally closed by a hinged door 10, and arranged on the inside of this left-hand side wall, around the opening 9, is a rectangular frame 11, in which is removably positioned a printing frame 12, carrying a section 13 of glass or analogous transparent material, and hinged to the lower end of this printing frame 12 is a plate 14, which is normally forced against the transparent section 13 by means of a spring 15 fixed to the frame 12, and the free end of which spring bears against the plate 14.

Located in the lower portion and front end of the box is a pair of vertically disposed partitions 16, which form compartments 17, adapted to contain a supply of sensitized photographic plates and cards, upon which latter the pictures are printed, and arranged to slide horizontally, immediately above the tops of these partitions, is a plate 18 which forms a cover for the compartments 17. Arranged on top of this plate 18 is a pair of strips 19, between which is arranged to slide a block 20, carrying a vertically disposed L-shaped plate holder 21, and passing through this block 20 is a set screw 22, by means of which said block is fixed in position on the plate 18 after adjustment, and formed on one of the strips 19 is a scale 23, and carried by the front end of the block 20 is a finger 24, which travels over this scale, thus providing means for properly determining the position of the plate holder 21 relative to the lens in the front wall of the box, and which adjustment is essential to obtain the proper focus while making a negative.

Located in the lower rear portion of the box is a rectangular sheet metal tank 25, which is divided into compartments 26 by means of vertically disposed partitions 27, and fixed on one side wall of this tank and projecting into two of the compartments are vertically disposed strips 28, between which the exposed plates are positioned while being developed and fixed. The compartments 26 in this tank receive the liquids used as developing and fixing baths for the negatives and printed pictures.

To make a negative with my improved apparatus, the operator, after opening the cover 2, inserts one hand through the sleeve 7, slides the plate 18 forward and removes a sensitized plate from the compartment 17, containing the supply of plates, after which the cover 2 is closed and the plate is arranged in the plate holder 21. The block 20 is now adjusted backward and forward on the plate 18 to secure the proper focus, and the shutter of the lens 8 is now opened to make the exposure, after which the exposed plate is removed from the plate holder and placed in the developing bath contained in one of the compartments 26. During this operation the operator has a clear view of the interior of the box through the section of red celluloid or glass 5, and after the exposed plate has been properly developed, it is removed from the developing bath and placed in the fixing bath. After the exposed plate has been fixed and dried the plate 14 is swung away from the plate holder 12 and said exposed plate is placed directly against the transparent section 13, after which a sensitized card or sheet of paper taken from the supply contained in one of the compartments is placed against said exposed plate, after which the plate 14 is allowed to swing upward into its normal position, and thus the sensitized card or sheet is pressed against the negative. The door 10 is now swung open to accomplish the printing operation, after which the negative and printed card or sheet are removed from the printing frame and said card or sheet is subjected to the proper fixing bath, and after being dried said card or sheet is ready for delivery.

An apparatus of my improved construction is very simple, compact, can be readily transported, and by its use photographic prints are easily, quickly and cheaply produced. The plate holder within the box may be readily adjusted to obtain the proper focus, and by providing the section 5 of colored celluloid or glass the entire interior of the box may be readily viewed while performing the various operations necessary to produce the finished pictures.

I claim:

1. In an apparatus of the class described, a box, a colored transparent cover closing the top of the box, a combined lens and shutter located in one of the walls of the box, a series of partitions arranged in the bottom of the box to form compartments therein, a plate arranged to slide above the partitions and to form a cover for the compartments, and an adjustable plate holder arranged on said plate.

2. In an apparatus of the class described, a box, a colored transparent cover closing the top of the box, a combined lens and shutter located in one of the walls of the box, a series of partitions arranged in the bottom of the box to form compartments therein, a tank located in the lower portion of the box and which tank is divided into compartments, a plate arranged to slide above the partitions and to form a cover for the first mentioned compartments, and an adjustable plate holder arranged on said plate.

3. In an apparatus of the class described, a box, a colored transparent cover closing the top of the box, a combined lens and shutter located in one of the walls of the box, a series of partitions arranged in the bottom of the box to form compartments therein, a plate arranged to slide above the partitions and to form a cover for the compartments, an adjustable plate holder arranged on said plate, there being a printing opening formed in one wall of the box, a door normally closing said opening, and a printing frame arranged in said opening.

4. In an apparatus of the class described, a box, a colored transparent cover closing the top of the box, a combined lens and shutter located in one of the walls of the box, a series of partitions arranged in the bottom of the box to form compartments therein, a tank located in the lower portion of the box and which tank is divided into compartments, a plate arranged to slide above the partitions and to form a cover for the first mentioned compartments, an adjustable plate holder arranged on said plate, there being a printing opening formed in one wall of the box, a door normally closing said opening, and a printing frame arranged in said opening.

5. In an apparatus of the class described, a box, a colored transparent cover closing the top of the box, a combined lens and shutter located in one of the walls of the box, a series of partitions arranged in the bottom of the box to form compartments therein, a plate arranged to slide above the partitions and to form a cover for the compartments, an adjustable plate holder arranged on said plate, there being an arm opening formed in one of the walls of the box, and a flexible sleeve, one end of which is fixed in the arm opening.

6. In an apparatus of the class described, a box, a colored transparent cover closing the top of the box, a combined lens and shutter located in one of the walls of the box, a series of partitions arranged in the bottom of the box, to form compartments therein, a tank located in the lower portion of the box and which tank is divided into compartments, a plate arranged to slide above the partitions and to form a cover for the first mentioned compartments, an adjustable plate holder arranged on said plate, there being an arm opening formed in one of the walls of the box, and a flexible sleeve, one end of which is fixed in the arm opening.

7. In an apparatus of the class described, a box, a colored transparent cover closing the top of the box, a combined lens and shutter located in one of the walls of the box, a series of partitions arranged in the bottom of the box to form compartments therein, a plate arranged to slide above the partitions and to form a cover for the compartments, an adjustable plate holder arranged on said plate, there being a printing opening formed in the wall of the box, a door normally closing said opening, a printing frame arranged in said opening, there being an arm opening formed in one of the walls of the box, and a flexible sleeve, one end of which is fixed in the arm opening.

8. In an apparatus of the class described, a box, a colored transparent cover normally closing the top of the box, partitions located in the lower portion of the box and dividing the same into a series of compartments, a sliding plate forming a cover for certain of the compartments, an adjustable plate holder arranged on the sliding plate, and a photographic lens located in one of the walls of the box.

9. In an apparatus of the class described, a box, a colored transparent cover normally closing the top of the box, partitions located in the lower portion of the box and dividing the same into a series of compartments, an adjustable plate holder arranged on the sliding plate, a photographic lens located in one of the walls of the box, there being an arm opening formed in one of the walls of the box, and a flexible sleeve, one end of which is fixed in the arm opening.

In testimony whereof, I have signed my name to this specification, in presence of two subscribing witnesses.

JOHN B. WILLYERD.

Witnesses:
M. P. SMITH,
E. L. WALLACE.